J. W. GAMBLE.
LEVER ADJUSTMENT FOR WHEEL PLOWS.
APPLICATION FILED MAR. 25, 1911.
1,075,777.
Patented Oct. 14, 1913.
2 SHEETS—SHEET 1.
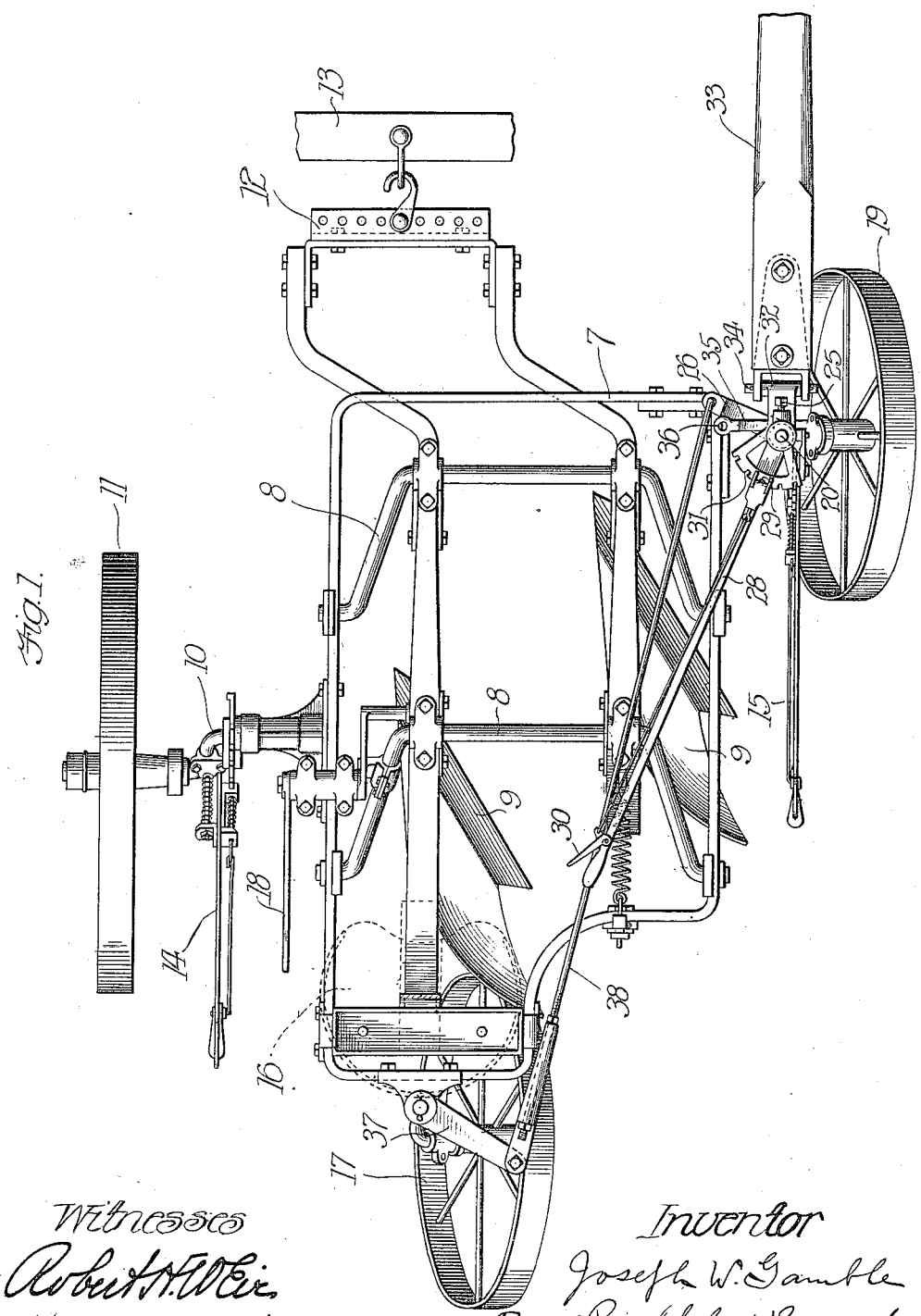

J. W. GAMBLE.
LEVER ADJUSTMENT FOR WHEEL PLOWS.
APPLICATION FILED MAR. 25, 1911.
1,075,777.
Patented Oct. 14, 1913.
2 SHEETS—SHEET 2.
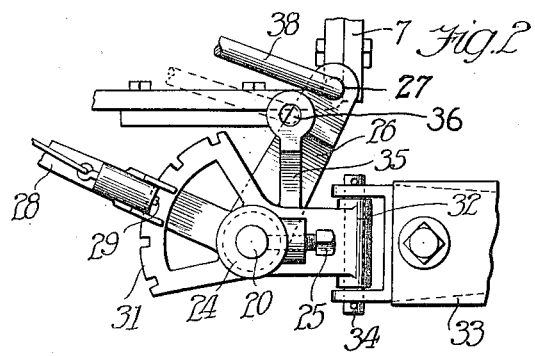
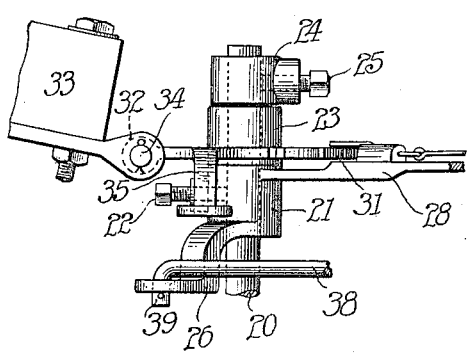
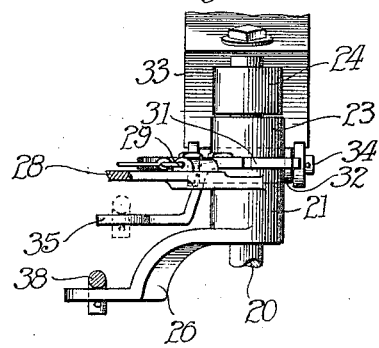
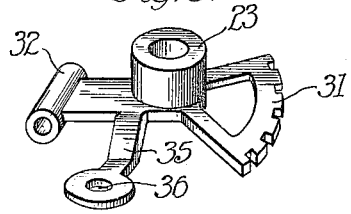
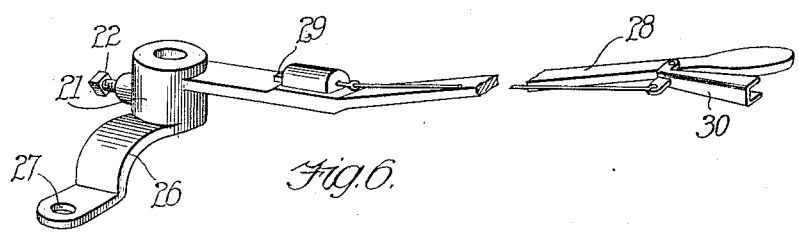
Witnesses
Robert N. Weir
H. A. Swenarton
Inventor
Joseph W. Gamble
By Bulkley & Durand
Attys.
COLUMBIA PLANOGRAPH CO., WASHINGTON, D. C.

UNITED STATES PATENT OFFICE.

JOSEPH W. GAMBLE, OF CARPENTERSVILLE, ILLINOIS.

LEVER ADJUSTMENT FOR WHEEL-PLOWS.

1,075,777. Specification of Letters Patent. Patented Oct. 14, 1913.

Application filed March 25, 1911. Serial No. 616,866.

*To all whom it may concern:*

Be it known that I, JOSEPH W. GAMBLE, a citizen of the United States of America, and resident of Carpentersville, Kane county, Illinois, have invented a certain new and useful Improvement in Lever Adjustments for Wheel-Plows, of which the following is a specification.

My invention relates to wheel plows, and more particularly to an arrangement of levers whereby the front and rear furrow wheel can be readily adjusted. Heretofore it has been necessary, in order to adjust the furrow wheels to or from the land, to stop the plow and loosen or remove certain parts and adjust the furrow wheels in proper position, then replacing the removed parts. By my improved construction, however, I am enabled to readily adjust either or both of the furrow wheels by means of hand levers which are in easy reach of the driver, so that the furrow wheels can be properly adjusted while the plow is being operated.

These and other advantages of my invention will be more readily understood by reference to the accompanying drawings, in which—

Figure 1 is a plan view of a plow, including my device. Figs. 2, 3, 4, 5 and 6 are detailed views of various parts which go to make up my invention.

Throughout the specification and drawings, similar reference characters refer to similar parts.

Fig. 1 shows a wheeled plow of the usual construction, comprising a frame 7 within which are hung suitable bail-shaped hangers 8 which support the plow bodies 9. The frame is supported by the axle 10 and a landside wheel 11. A suitable clevis 12, to which is attached the evener 13, is connected to the end of the plow beams in a well known manner, said plow beams being offset toward the land side, so as to obtain an offset draft connection, but to still maintain an equal draft upon the two beams. A lever 14 is employed for adjusting the landside wheel 11 and the lever 15 for raising and lowering the frame, while the lever 18 is provided for raising and lowering the plow bodies. The driver's seat is mounted in the frame, as shown in dotted lines at 16. Mounted at the rear of the frame 7 is a suitable standard, which supports the rear furrow wheel 17.

All the foregoing is of well known construction, and as it forms no part of my present invention, it is not thought necessary to describe the same more in detail.

The front furrow wheel 19 is mounted upon a suitable standard 20. Upon the upper portion of this standard there is mounted a sleeve 21 which is held rigid with this standard by means of a set-screw 22. Likewise mounted upon the standard 20, immediately above the sleeve 21, is a second sleeve 23 which is loose upon the standard. A third sleeve 24 is held in place upon this standard 20 by means of the set-screw 25 in order to prevent the sleeve 23 from sliding upward upon this standard. The sleeve 21 is provided with a downwardly extending arm 26 provided at its lower end with a flat portion in which there is an opening 27. Extending rearwardly from the upper portion of this sleeve 21 is an operating lever 28 which extends to a position adjacent and readily accessible from the driver's seat. This operating lever is provided with a spring finger 29 which is operated by the auxiliary hand-lever 30 in the well known manner. This spring finger is adapted to engage in the notches in the arc rack 31 which is formed as an extension of the sleeve 23, and which extends rearwardly from this sleeve. This sleeve 23 is likewise provided with a forward extension 32, to which the main tongue 33 is connected by means of the pin 34, in the usual and well known manner. Likewise extending from this sleeve 23 there is a downwardly curved arm 35 provided with a flat lower end having an opening 36. Mounted upon the upper portion of the standard, in which the rear caster wheel is mounted, there is a laterally extending arm 37 to the end of which is connected the forwardly extending rod 38. The forward end of this rod is provided with a downwardly bent end-portion 39, which end-portion is adapted to engage with the openings in either of the downwardly extending arms 26 or 35, depending upon whether it is desired to adjust both of the front and rear caster wheels together, or whether it is desired merely to adjust the front caster wheel.

It will be noted that when the spring finger 29 is in engagement with the arc rack 31, the tongue and furrow wheels are rigidly connected together, whereby the tongue can properly steer the plow, in the operation of plowing.

The operation of my improved device is as follows: First assuming that it is desired to adjust both of the two furrow wheels in unison. The end of the rod 38 is inserted in the opening 27 within the downwardly extending arm 26 which is associated with the sleeve 21. The finger lever 30 is then operated so as to withdraw the spring finger 29 from engagement with the rack 31, and then by movement of the operating lever 28 the sleeve 21 can be rotated through the desired angle, which rotation is imparted to the standard 20 on account of the sleeve 21 being fast with this standard, which in turn causes the proper adjustment of the front furrow wheel. If it is desired to adjust the front furrow wheel so that it turns in more toward the land, the operating lever is moved in one direction, while if it is desired to turn the front furrow wheel more toward the furrow, the operating lever is operated in the opposite direction. This movement of the sleeve 21 likewise imparts motion to the rearwardly extending connecting rod 38, which, through the connection 37, causes proper angular adjustment of the rear caster wheel 17. In adjusting these wheels it is desirable that when the front furrow wheel is toed in toward the land the rear furrow wheel is toed out toward the furrow. The connecting rod is so connected that it accomplishes this reverse adjustment of the rear furrow wheel.

If it is desired to merely adjust the front furrow wheel without any adjustment of the rear furrow wheel, then the forward end of the connecting rod 38 is inserted within the opening 36 associated with the sleeve 23. With this connection it is readily seen that when the spring finger 29 is removed from engagement with the rack 31, and the operating lever operated in the above described manner, there is no connection with the movable parts and the rear furrow wheel, and that accordingly the front furrow wheel is adjusted independently of this rear furrow wheel. It will thus be seen that I have provided ready and efficient means for adjusting either one or both of the furrow wheels without removing or loosening any parts, and which means is within easy reach of the operator when he is riding in the driver's seat.

While I have shown a specific embodiment of my invention, it is understood that I do not wish to be limited to the exact construction there shown and described.

What I claim as my invention is:

1. In a wheel plow, a land-side wheel and a front and rear wheel, a connection uniting said front and rear wheels, a standard upon which said front wheel is mounted, a sleeve rigidly mounted upon said standard, a second sleeve loosely mounted upon said standard, a tongue connected to said second sleeve, means for normally maintaining said sleeves in rigid connection with each other, and means for breaking this rigid connection so that said first-mentioned sleeve can be rotated independently of said second-mentioned sleeve in order to adjust said front and rear wheels to or from the edge of the land.

2. In a wheel plow, a land-side wheel and front and rear wheels, a connection uniting said front and rear wheels, a standard upon which said front wheel is mounted, a sleeve rigidly mounted upon said standard, a second sleeve loosely mounted upon said standard, a tongue connected to said second sleeve, a rearwardly extending hand lever connected to the said first-mentioned sleeve, and means associated with said hand lever for normally maintaining said sleeves connected with each other, means for disconnecting said sleeves, whereby said first-mentioned sleeve can be rotated by the hand lever to adjust said front and rear wheels to or from the edge of the land.

3. In a wheel plow, front and rear wheels, a standard upon which said front wheel is mounted, a sleeve fast upon said standard, a second sleeve loose upon said standard, a connecting rod connected at its rear end with said rear wheel, and adapted at its front end to be connected with either of said sleeves.

4. In a wheel plow, front and rear wheels, a standard upon which said front wheel is mounted, a sleeve fast upon said standard, a second sleeve loose upon said standard, an arc rack mounted upon said loose sleeve, an operating lever mounted upon said fast sleeve and carrying a spring finger adapted to engage with said arc rack, and means for connecting said rear wheel to either of said sleeves, together with means for disengaging said spring finger from said arc rack, whereby said operating lever can be rotated so as to adjust the angular position of said wheels.

Signed by me at Carpentersville, Illinois, this 23rd day of March 1911.

JOSEPH W. GAMBLE.

Witnesses:
R. P. ARVEDSON,
J. H. CRICHTON.